(12) United States Patent
Matsuura et al.

(10) Patent No.: US 10,371,805 B2
(45) Date of Patent: Aug. 6, 2019

(54) ULTRASONIC OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP); NIPPON SOKEN, INC., Nishio, Aichi-pref. (JP)

(72) Inventors: Mitsuyasu Matsuura, Nishio (JP); Taketo Harada, Kariya (JP); Takuya Nomura, Kariya (JP); Motonari Ohbayashi, Nagakute (JP); Hironobu Ishijima, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP); NIPPON SOKEN, INC., Nishio, Aichi-pref. (JP)

( * ) Notice: Subject to any disclaimer, the term of this patent is extended or adjusted under 35 U.S.C. 154(b) by 275 days.

(21) Appl. No.: 15/515,525

(22) PCT Filed: Oct. 21, 2015

(86) PCT No.: PCT/JP2015/005296
§ 371 (c)(1),
(2) Date: Mar. 29, 2017

(87) PCT Pub. No.: WO2016/063525
PCT Pub. Date: Apr. 28, 2016

(65) Prior Publication Data
US 2017/0219698 A1 Aug. 3, 2017

(30) Foreign Application Priority Data
Oct. 22, 2014 (JP) .................. 2014-215719

(51) Int. Cl.
*G01S 15/00* (2006.01)
*G01S 7/526* (2006.01)
(Continued)

(52) U.S. Cl.
CPC .......... *G01S 7/526* (2013.01); *G01S 7/52006* (2013.01); *G01S 7/529* (2013.01); *G01S 15/025* (2013.01);
(Continued)

(58) Field of Classification Search
None
See application file for complete search history.

(56) References Cited

U.S. PATENT DOCUMENTS 6,092,338 A * 7/2000 Crowner ............... E05F 15/643
49/360
6,152,238 A * 11/2000 Ferrell .................... E02F 3/847
172/2
(Continued)

FOREIGN PATENT DOCUMENTS

DE 102013219680 A1 * 6/2014 ........... G01S 15/931
DE 102015106934 A1 * 11/2016 ........... G01S 15/931
(Continued)

*Primary Examiner* — Isam A Alsomiri
*Assistant Examiner* — Jonathan D Armstrong
(74) *Attorney, Agent, or Firm* — Knobbe, Martens, Olson & Bear, LLP

(57) ABSTRACT

An obstacle detection apparatus includes: a transceiver transmitting a transmission wave and receiving an ultrasonic wave; a transmission controller; a receiver circuit detecting a signal level of a receiving wave; a distance calculator sequentially calculating a distance to an object reflecting the transmission wave; a memory storing the distance to the object; an obstacle determination device determining whether the object is an obstacle; and a reception level monitoring device monitoring the signal level of the receiving wave before the transmission wave being transmitted.

(Continued)

When the signal level exceeds a predetermined threshold, the obstacle determination device sets a first number of determination data elements to an increased number of determinations for a predetermined period to be used for determining whether the object is the obstacle, as being larger than a second number of determination data elements used when the signal level does not exceed the predetermined threshold.

9 Claims, 10 Drawing Sheets

(51) Int. Cl.
G01S 15/93 (2006.01)
G01S 15/02 (2006.01)
G01S 7/52 (2006.01)
G01S 7/529 (2006.01)
G01S 15/87 (2006.01)
G08G 1/16 (2006.01)

(52) U.S. Cl.
CPC ............ *G01S 15/87* (2013.01); *G01S 15/93* (2013.01); *G01S 15/931* (2013.01); *G01S 2015/938* (2013.01); *G08G 1/16* (2013.01)

(56) References Cited

U.S. PATENT DOCUMENTS

| | | | |
|---|---|---|---|
| 6,194,851 B1 * | 2/2001 | Denault | E05F 15/643 318/139 |
| 2004/0130442 A1 * | 7/2004 | Breed | B60C 11/24 340/443 |
| 2007/0076526 A1 | 4/2007 | Aikyo et al. | |
| 2009/0260422 A1 | 10/2009 | Sugiura et al. | |
| 2010/0220551 A1 | 9/2010 | Akiyama et al. | |
| 2012/0174673 A1 | 7/2012 | Sugiura et al. | |
| 2014/0039755 A1 * | 2/2014 | Yopp | G01S 15/931 701/36 |
| 2014/0074345 A1 * | 3/2014 | Gabay | G07C 5/008 701/31.4 |
| 2014/0148992 A1 * | 5/2014 | Shaffer | G01S 15/931 701/33.7 |
| 2014/0195111 A1 * | 7/2014 | Klimesch | G01K 3/06 701/36 |
| 2015/0192479 A1 * | 7/2015 | Jochemczyk | G01K 13/02 73/627 |
| 2015/0268335 A1 | 9/2015 | Nakano et al. | |
| 2016/0116343 A1 * | 4/2016 | Dixon | G01J 1/44 250/342 |
| 2016/0138967 A1 * | 5/2016 | Schuhmacher | G01H 17/00 73/645 |
| 2017/0166218 A1 * | 6/2017 | Hoare | B60W 40/105 |
| 2017/0219698 A1 * | 8/2017 | Matsuura | G01S 15/93 |
| 2018/0201152 A1 * | 7/2018 | Newman | B60L 11/1874 |
| 2018/0273374 A1 * | 9/2018 | Keal | G01K 11/24 |
| 2018/0362024 A1 * | 12/2018 | Ernesti | B62D 15/0285 |

FOREIGN PATENT DOCUMENTS

| | | |
|---|---|---|
| JP | 2010-014497 A | 1/2010 |
| JP | 2012-146025 A | 8/2012 |

* cited by examiner

ULTRASONIC OBJECT DETECTION APPARATUS

CROSS REFERENCE TO RELATED APPLICATION

This application is based on Japanese Patent Application No. 2014-215719 filed on Oct. 22, 2014, the disclosure of which is incorporated herein by reference.

TECHNICAL FIELD

The present disclosure relates to an ultrasonic object detection apparatus that detects an object by transmitting and receiving an ultrasonic wave.

BACKGROUND ART

Attenuation of sound waves including ultrasonic waves propagating through the air is temperature dependent. The object detection performance of an ultrasonic object detection apparatus may therefore vary with a change in temperature. According to Patent Literature 1, temperature data is acquired from a temperature sensor provided outside an ultrasonic sensor of a vehicle to calculate a correction amount.

An outside air temperature sensor in a vehicle is generally provided for an air conditioner and commonly installed inside the engine room. It is known that temperatures cannot always be measured accurately because of the engine exhaust heat and the like. In the case of a malfunction, the outside air temperature sensor cannot detect temperatures correctly. In the case that the outside air temperature sensor fails to detect temperatures accurately, if the sensitivity setting of the ultrasonic sensor is based on the temperature acquired from the measurement of the outside air temperature sensor, the ultrasonic wave reception will be made with a wrong sensor sensitivity, which will lower the object detection accuracy.

PRIOR ART LITERATURES

Patent Literature

Patent Literature 1: JP 2014-89071 A

SUMMARY OF INVENTION

It is an object of the present disclosure to provide an ultrasonic object detection apparatus with good object detection accuracy.

According to an aspect of the present disclosure, an ultrasonic object detection apparatus mounted to a vehicle includes: at least one transceiver that transmits a transmission wave as an ultrasonic wave to outside of the vehicle and receives a reflection wave of the transmission wave reflected by an object; at least one reception circuit that detects a signal level of the reflection wave received by the transceiver; at least one object detector that detects an object, based on a comparison between the signal level detected by the reception circuit and an object detection threshold; at least one sensor temperature detector that detects an ambient temperature of the transceiver; and a detection sensitivity adjuster that performs a detection sensitivity adjustment, which is an adjustment of at least one of a detection sensitivity of the reception circuit and the object detection threshold, based on the ambient temperature detected by the at least one sensor temperature detector.

According to one aspect of the present disclosure, at least one of the detection sensitivity of the reception circuit and the object detection threshold is adjusted based on an ambient temperature detected by a sensor temperature detector, so that an adjustment can be made based on a temperature close to the actual outside air temperature. Thus an object can be detected with good accuracy. When a plurality of ultrasonic sensors are mounted, it is unlikely that all the sensors malfunction at the same time, so that an object can be detected with good accuracy.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

A first embodiment of the present disclosure will be hereinafter described with reference to the drawings. An ultrasonic object detection apparatus 1 shown in FIG. 1 includes ultrasonic sensors 10A to 10L and a sonar ECU 20. This ultrasonic object detection apparatus 1 is mounted on a vehicle C shown in FIG. 2.

(Configuration of Ultrasonic Sensor 10)

Figure 1:
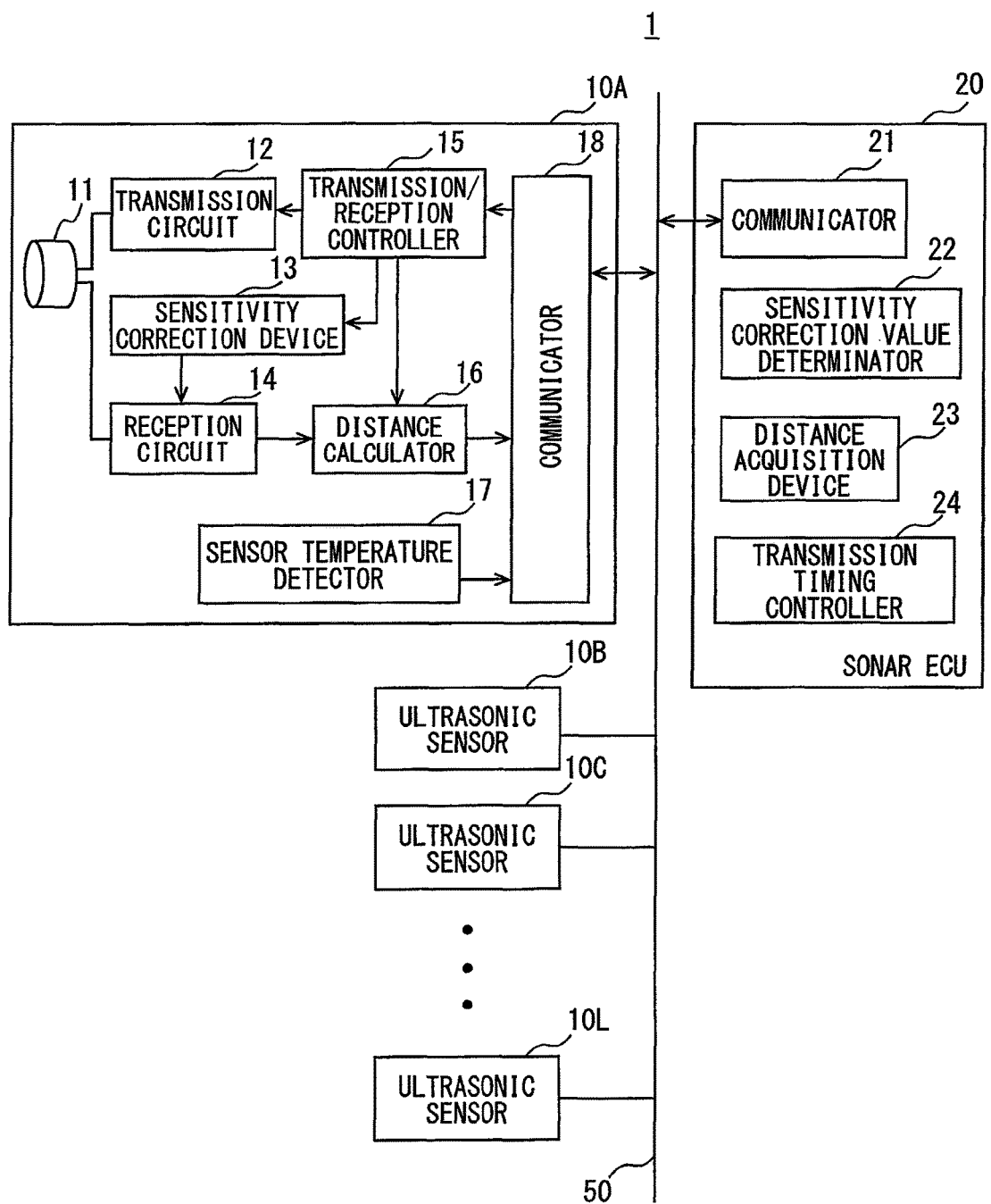
FIG. 1 is a configuration diagram showing an ultrasonic object detection apparatus according to a first embodiment.

Each of the ultrasonic sensors 10A to 10L has the same configuration. Hereinafter, when it is not particularly necessary to distinguish the ultrasonic sensors 10A to 10L, the ultrasonic sensors 10A to 10L will be referred to simply as an ultrasonic sensor 10. As shown in FIG. 1, the ultrasonic sensor 10 includes a transceiver 11, a transmitter circuit 12, a sensitivity correction unit 13, a reception circuit 14, a transmission/reception controller 15, a distance calculator 16, a sensor temperature detector 17, and a communication unit 18.

The transceiver 11 generates a wave that is an ultrasonic wave and transmits this wave, as well as receives an ultrasonic wave coming from outside. The transceiver then outputs a signal indicative of the intensity of the received ultrasonic wave (hereinafter, received wave) to the reception circuit 14.

The transmitter circuit 12 generates a pulse signal when a transmission instruction signal is input from the transmission/reception controller 15, and outputs this pulse signal to the transceiver 11. The transceiver 11 is driven by this pulse signal and transmits waves in pulses.

The sensitivity correction unit 13 corrects the sensitivity of the reception circuit 14 when the reception circuit detects a received wave. More specifically, the sensitivity correction unit 13 includes a memory that stores a sensitivity correction table shown in FIG. 3.

This sensitivity correction table specifies the relationship between reception time and reception gain for each of several different temperatures (Temp (1) to Temp (n)). The relationship specified in the sensitivity correction table for each temperature is such that the longer the reception time, the higher the reception gain until a certain time point. The reason why the relationship between reception time and reception gain has this tendency is that, the longer the reception time, the longer the distance to an object, and the longer the distance, the larger the attenuation of the ultrasonic wave. The reason why the relationship between reception time and reception gain is specified for each of different temperatures is that the attenuation of ultrasonic wave is temperature dependent.

Figure 3:
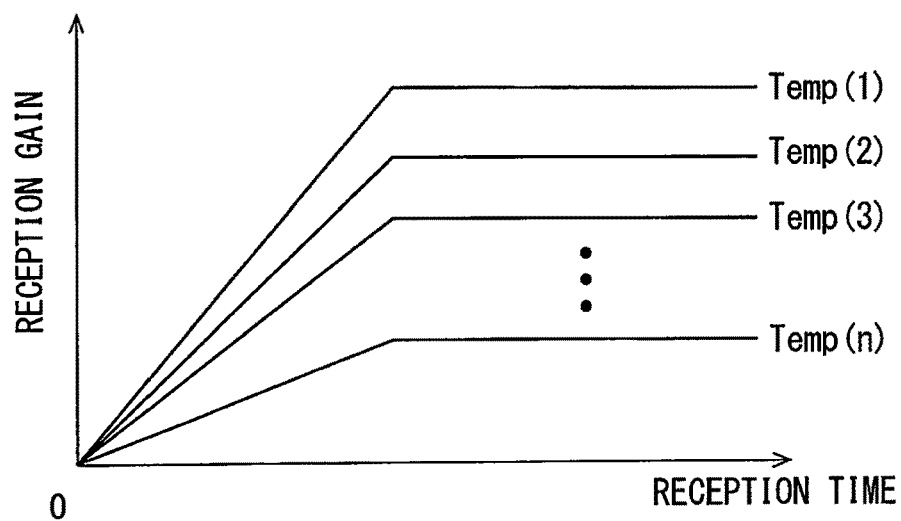
FIG. 3 is a diagram showing a sensitivity correction table stored in a sensitivity correction unit.

The sensitivity correction unit 13 selects one reception time-reception gain relationship from a sensitivity correction table shown in FIG. 3, based on a temperature to be used for sensitivity correction (hereinafter, "sensitivity correction temperature"). The reception time-reception gain relationship is used when receiving a wave. This sensitivity correction temperature is sent from the sonar ECU 20 via the communication unit 18 and transmission/reception controller 15. While the sensitivity correction temperature is a contiguously changing value, the temperatures for which the reception time-reception gain relationship is each specified in the sensitivity correction table are non-contiguous. Therefore, from the temperatures for which the reception time-reception gain relationship is each specified in the sensitivity correction table, a temperature that is closest to the sensitivity correction temperature is selected, to determine the reception time-reception gain relationship.

The sensitivity correction unit 13 is also notified of transmission of a transmission instruction signal from the transmission/reception controller 15. Upon receiving this notification, the sensitivity correction unit 13 controls the reception gain, i.e., the reception sensitivity, of the reception circuit 14, based on the reception time-reception gain relationship selected from the sensitivity correction table. This controlling of the reception gain of the reception circuit 14 corresponds to the adjustment of detection sensitivity.

The reception circuit 14 amplifies and performs A/D conversion on the signal which is input from the transceiver 11 and is indicative of the intensity of the received wave, and outputs a signal after the amplification and A/D conversion (hereinafter, reception signal) to the distance calculator 16. The reception circuit 14 includes a variable amplifier so as to be able to change the reception gain. Since the reception gain is controlled by the sensitivity correction unit 13, when the transceiver 11 receives a reflection wave reflected by an object, the reception circuit 14 outputs a reception signal of substantially the same intensity irrespective of the distance to the object, during the period in which the reception gain is controlled. Since the reception gain is controlled based on the reception time-reception gain relationship selected in accordance with a sensitivity correction temperature, when the transceiver 11 receives a reflection wave reflected by an object, the reception circuit 14 outputs a reception signal of substantially the same intensity irrespective of the outside air temperature.

The transmission/reception controller 15 outputs a transmission instruction signal to the transmitter circuit 12 when the transmission/reception controller 15 acquires the transmission instruction signal transmitted from the sonar ECU 20 from the communication unit 18. The transmission/reception controller also notifies the sensitivity correction unit 13 and distance calculator 16 that the transmission/reception controller 15 has output a transmission instruction signal. In addition, when the transmission/reception controller acquires a sensitivity correction temperature transmitted from the sonar ECU 20 from the communication unit 18, the transmission/reception controller 15 outputs this sensitivity correction temperature to the sensitivity correction unit 13.

The distance calculator 16 calculates the distance to an object from the time interval from when the transceiver 11 transmits a wave to when a wave with an intensity of not less than an object detection threshold is received. The time point when the transceiver 11 transmits a wave is the time point when the transceiver receives a notification from the transmission/reception controller 15 that a transmission instruction signal has been output. The time point when a wave is received with an intensity of not less than an object detection threshold is the time point when the reception signal exceeds the object detection threshold for the first time after a predetermined time has passed from the transmission of the transmission wave. A predetermined time period is let pass so as to exclude the period in which reverberation of the transmission wave exists. This time interval multiplied by the speed of sound and divided by two is the distance to the object. The distance to the object calculated by the distance calculator 16 will be hereinafter referred to as detected distance. The distance calculator 16 also corresponds to the object detector since the distance calculator 16 actually detects an object.

The sensor temperature detector 17 is a temperature detector built in the ultrasonic sensor 10. That is, the sensor temperature detector 17 detects an ambient temperature around the transceiver 11. Hereinafter, the temperature detected by the sensor temperature detector 17 will be referred to as sensor temperature. This sensor temperature detector 17 is configured by an electronic component that exhibits a large change in characteristics in accordance with a temperature change, such as a thermistor.

The communication unit 18 transmits the detected distance calculated by the distance calculator 16 and the sensor temperature detected by the sensor temperature detector 17 to a communication unit 21 of the sonar ECU 20 via a LIN bus 50. The communication unit 18 receives transmission instruction signals transmitted from the communication unit 21 of the sonar ECU 20, and outputs the transmission instruction signals to the transmission/reception controller 15.

(Configuration of Sonar ECU 20)

The sonar ECU 20 includes the communication unit 21, a sensitivity correction value determinator 22, a distance acquisition device 23, and a transmission timing controller 24. This sonar ECU 20 is a known circuit configuration that includes a CPU, ROM, RAM, I/O interface, and the like. The CPU executes programs stored in the ROM so that the sonar ECU 20 functions as the sensitivity correction value determinator 22, distance acquisition device 23, and transmission timing controller 24. Some or all of the functions executed by the sonar ECU 20 may be configured as hardware with one or a plurality of ICs or the like.

The communication unit 21 is a communication interface and communicates with the ultrasonic sensor 10 via the LIN bus 50. The sensitivity correction value determinator 22 determines a sensitivity correction temperature to be used for selecting a relationship between reception time and reception gain in the sensitivity correction unit 13 of the ultrasonic sensor 10. This sensitivity correction temperature is transmitted to the ultrasonic sensor 10 with the transmission instruction signal to be described later. When the sensitivity correction unit 13 of the ultrasonic sensor 10 acquires the sensitivity correction temperature, as mentioned above, the reception gain is adjusted based on the sensitivity correction temperature. Therefore, this sensitivity correction value determinator 22 and the sensitivity correction unit 13 of the ultrasonic sensor 10 correspond to the detection sensitivity adjuster.

The distance acquisition device 23 acquires the detected distance calculated by the distance calculator 16 of the ultrasonic sensor 10 via the communication unit 21 and LIN bus 50. Certain driver assistance control, such as a notification of the presence of an obstacle, is performed based on this detected distance.

The transmission timing controller 24 outputs a transmission instruction signal to the ultrasonic sensor 10 to control the timing at which a wave is transmitted from the ultrasonic sensor 10. As mentioned above, the sensitivity correction temperature is output to the ultrasonic sensor 10 together with this transmission instruction signal. The process executed by the sensitivity correction value determinator 22, distance acquisition device 23, and transmission timing controller 24 will be described later in more detail with reference to FIG. 3 and FIG. 4.

(Layout of Ultrasonic Sensor 10)

Figure 2:
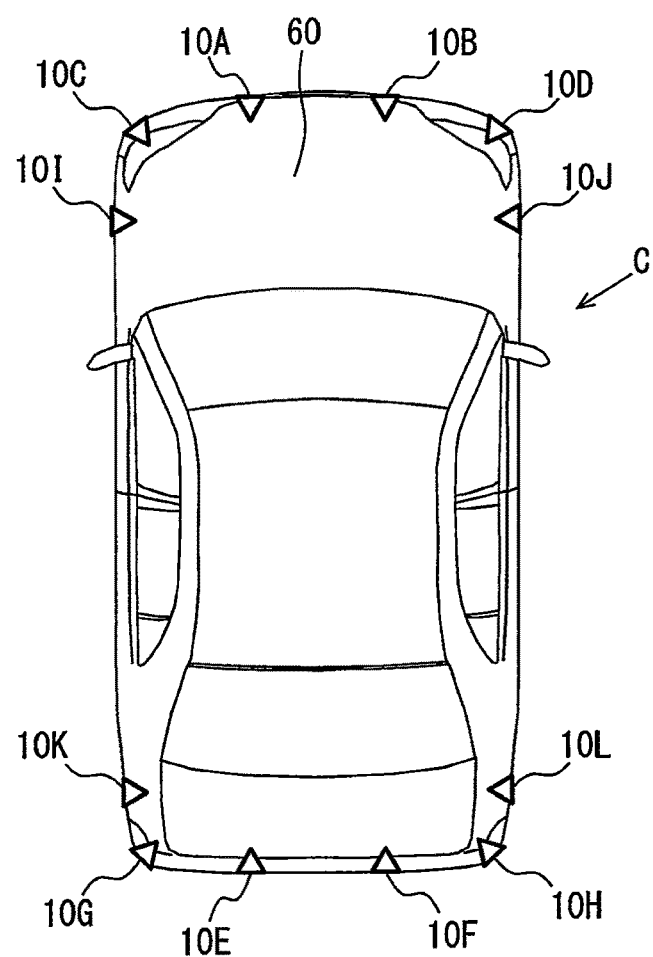
FIG. 2 is a diagram showing positions where ultrasonic sensors of FIG. 1 are attached.

As shown in FIG. 2, the ultrasonic sensors 10A to 10D are disposed on the front end face of the vehicle C, the ultrasonic sensors 10E to 10H are disposed on the rear end face of the vehicle C, and the ultrasonic sensors 10I to 10L are disposed on the side face of the vehicle C. The vehicle C includes an internal combustion engine (hereinafter, "engine") as the drive power source inside an engine room 60.

(Process Executed by Ultrasonic Sensor 10)

Figure 4:
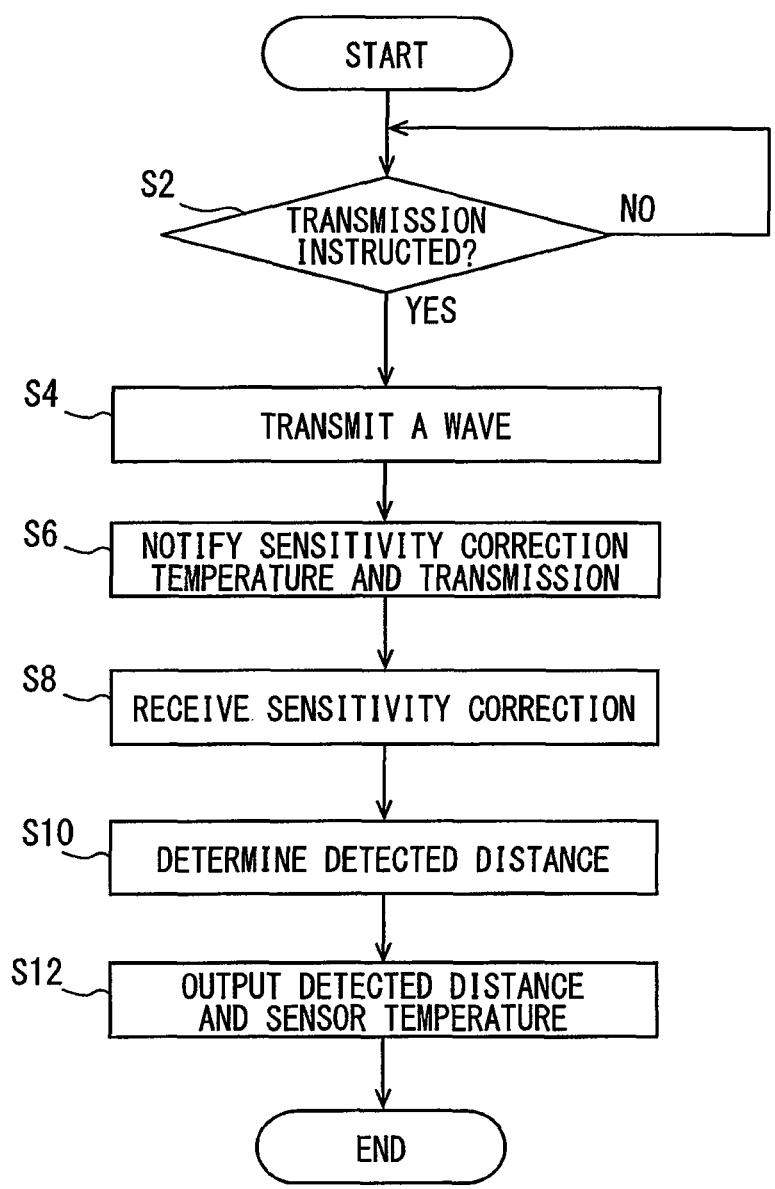
FIG. 4 is a diagram showing a flow of a process executed by an ultrasonic sensor.

Next, the flow of the process executed by the ultrasonic sensor 10 will be described with reference to FIG. 4. The ultrasonic sensor 10 executes this process shown in FIG. 4 repeatedly, for example, during power application. In FIG. 4, steps S2 to S6 are performed by the transmission/reception controller 15, step S8 is performed by the sensitivity correction unit 13 and reception circuit 14, and steps S10 and S12 are performed by the distance calculator 16.

At step S2, it is determined whether a transmission instruction signal output by the transmission timing controller 24 of the sonar ECU 20 has been acquired via the communication unit 18. If this determination is NO, step S2 is repeated, whereas, if YES, the process goes to step S4.

At step S4, a wave is transmitted from the transceiver 11. In other words, a transmission instruction signal is output to the transmitter circuit 12. When a transmission instruction signal is input, the transmitter circuit 12 generates a pulse signal, and outputs this pulse signal to the transceiver 11. Thus waves are transmitted in pulses from the transceiver 11.

At step S6, the sensitivity correction temperature is sent to the sensitivity correction unit 13, and the sensitivity correction unit 13 and distance calculator 16 are notified that a transmission instruction signal has been output.

At step S8, the sensitivity correction unit 13 controls the reception gain of the reception circuit 14 with the use of the relationship between reception time and reception gain that is determined based on the sensitivity correction temperature. The reception circuit 14 detects the received signal for a predetermined period of transmission/reception. This transmission/reception period starts at the time point when the wave is transmitted. At step S10, the time interval from when a wave is transmitted to when the level of the reception signal exceeds an object detection threshold is calculated, and this time interval is multiplied by the speed of sound and divided by two, to produce a detected distance. At step S12, the detected distance calculated at step S10 is output to the sonar ECU 20.

(Process Executed by Sonar ECU 20)

Figure 5:
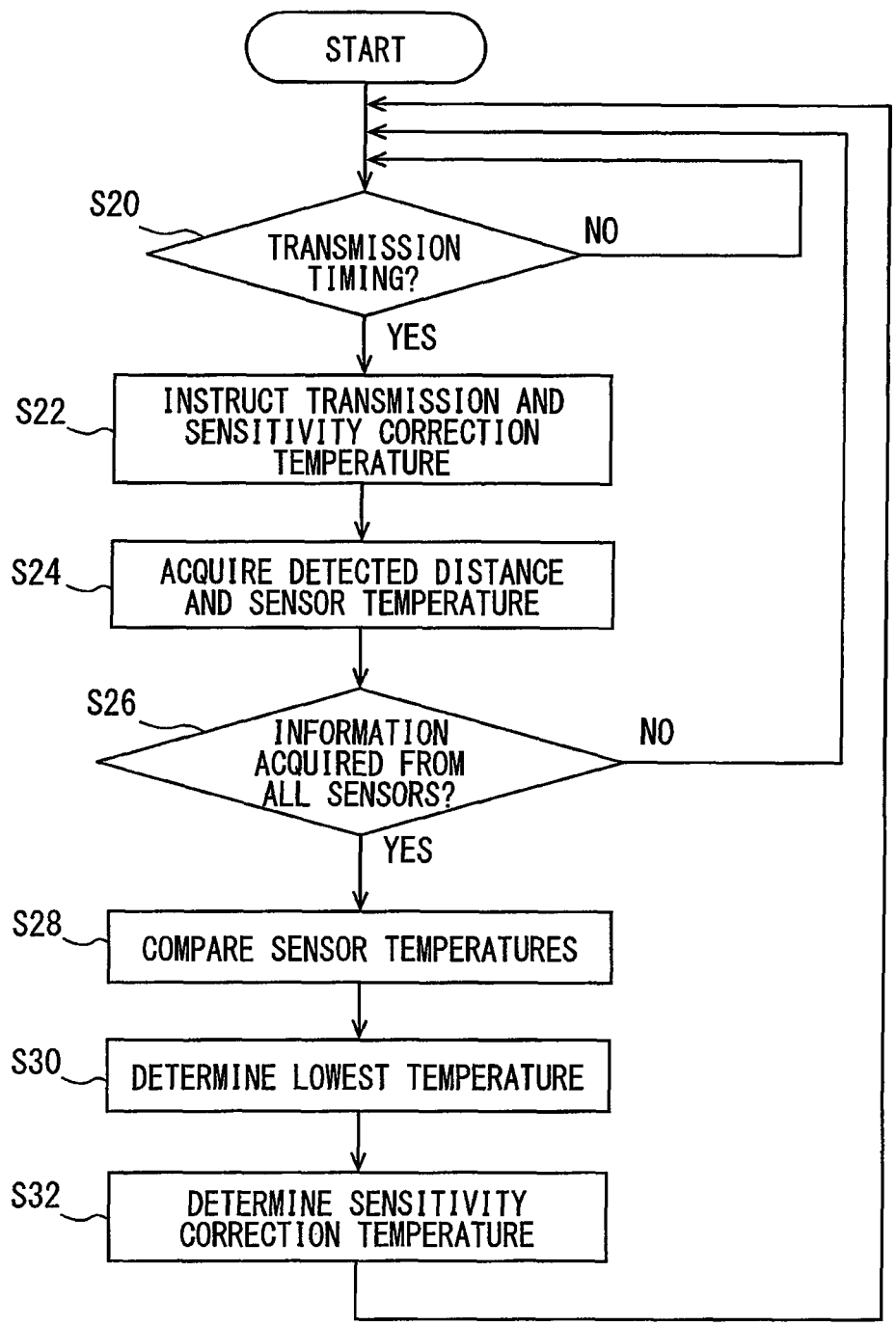
FIG. 5 is a flowchart showing a process executed by a sensitivity correction value determinator, a distance acquisition device, and a transmission timing controller of a sonar ECU.

Next, the process executed by the sensitivity correction value determinator 22, distance acquisition device 23, and transmission timing controller 24 of the sonar ECU 20 will be described with reference to FIG. 5. The process shown in FIG. 5 is executed repeatedly when a predetermined object detection condition is established. The object detection condition is, for example, a condition that the ignition is on, and the vehicle speed is less than a certain value. The certain value of vehicle speed is 30 km/h, for example.

In FIG. 5, step S20 is executed by the transmission timing controller 24, and step S22 is executed by the sensitivity correction value determinator 22 and distance acquisition device 23. Steps S24 and S26 are executed by the sensitivity correction value determinator 22 and distance acquisition device 23, and steps S28 to S32 are executed by the sensitivity correction value determinator 22.

At step S20, it is determined whether the transmission timing at which a wave is to be transmitted from the ultrasonic sensors 10A to 10L has been arrived at. This transmission timing is preset such that one or a plurality of ultrasonic sensors 10 of the ultrasonic sensors 10A to 10L transmit(s) a wave sequentially, for example. If the determination at step S20 is NO, step S20 is repeated. When the determination at step S20 is affirmative, the process goes to step S22.

At step S22, the transmission instruction signal and the sensitivity correction temperature are output to the ultrasonic sensor 10 where the transmission timing has been arrived at via the communication unit 21 and LIN bus 50. The sensitivity correction temperature has already been determined at step S32 to be described later in the previous cycle of this process of FIG. 5.

At step S24, a detected distance and a sensor temperature are acquired from the ultrasonic sensor 10 to which the transmission instruction signal has been output. If it is determined that a predetermined condition for executing a driver assistance function is established based on the detected distance, the predetermined driver assistance control is performed.

At step S26, it is determined whether the detected distance and sensor temperature have been acquired from all the ultrasonic sensors 10A to 10L. If this determination is NO, the process goes back to step S20, whereas, if affirmative, the process goes to step S28.

At step S28, the sensor temperatures acquired from all the ultrasonic sensors 10A to 10L are compared. At step S30, the lowest temperature of the temperatures compared at step S28 is determined. Here, the lowest temperature is determined excluding sensor temperatures that can be determined as abnormal values. Whether the value is abnormal or not is determined based on whether the difference between the sensor temperature specified as the lowest temperature and the second lowest sensor temperature is a predetermined value or more. At step S32, the lowest temperature determined at step S30 is made the sensitivity correction temperature.

Effects of First Embodiment

According to the present embodiment described above, the ultrasonic sensor 10 includes a sensor temperature detector 17, and a sensitivity correction temperature is determined based on a sensor temperature detected by this sensor temperature detector 17 (S28 to S32). Since the ultrasonic sensors 10A to 10L are disposed on one of the front end face, rear end face, and side face of the vehicle C, the sensor temperature detected by the sensor temperature detector 17 included in the ultrasonic sensors 10A to 10L is hardly affected by the engine exhaust heat.

Since the sensitivity correction temperature is determined with the use of this sensor temperature, a relationship between reception time and reception gain can be selected from the sensitivity correction table, based on a sensitivity correction temperature that is close to the actual outside air temperature. The reception gain is therefore made appropriate, so that the object can be detected with good accuracy.

In the present embodiment, the lowest temperature is determined from the sensor temperatures detected by the respective sensor temperature detectors 17 provided in the ultrasonic sensors 10A to 10L. While the sensor temperatures can be higher than the outside air temperature due to the heat inside the vehicle, the sensor temperatures are less likely to be lower than the outside air temperature. Therefore, the lowest temperature is likely to be close to the outside air temperature. Since this lowest temperature is made the sensitivity correction temperature, a relationship between reception time and reception gain can be selected from the sensitivity correction table, based on a sensitivity correction temperature that is close to the actual outside air temperature. Furthermore, the use of sensor temperatures each detected by a plurality of ultrasonic sensors 10A to 10L can ensure accurate detection of an object, since it is unlikely that all the sensors malfunction at the same time.

Second Embodiment

Next, a second embodiment will be described. In the description of the second embodiment and the following embodiments, the elements given the same reference numerals as those that have been used before are, unless otherwise specified, the same as the elements with the same reference numerals in the preceding embodiment. Where only some features of a configuration are explained, the above-described embodiment can be applied to other features of the configuration.

Figure 6:
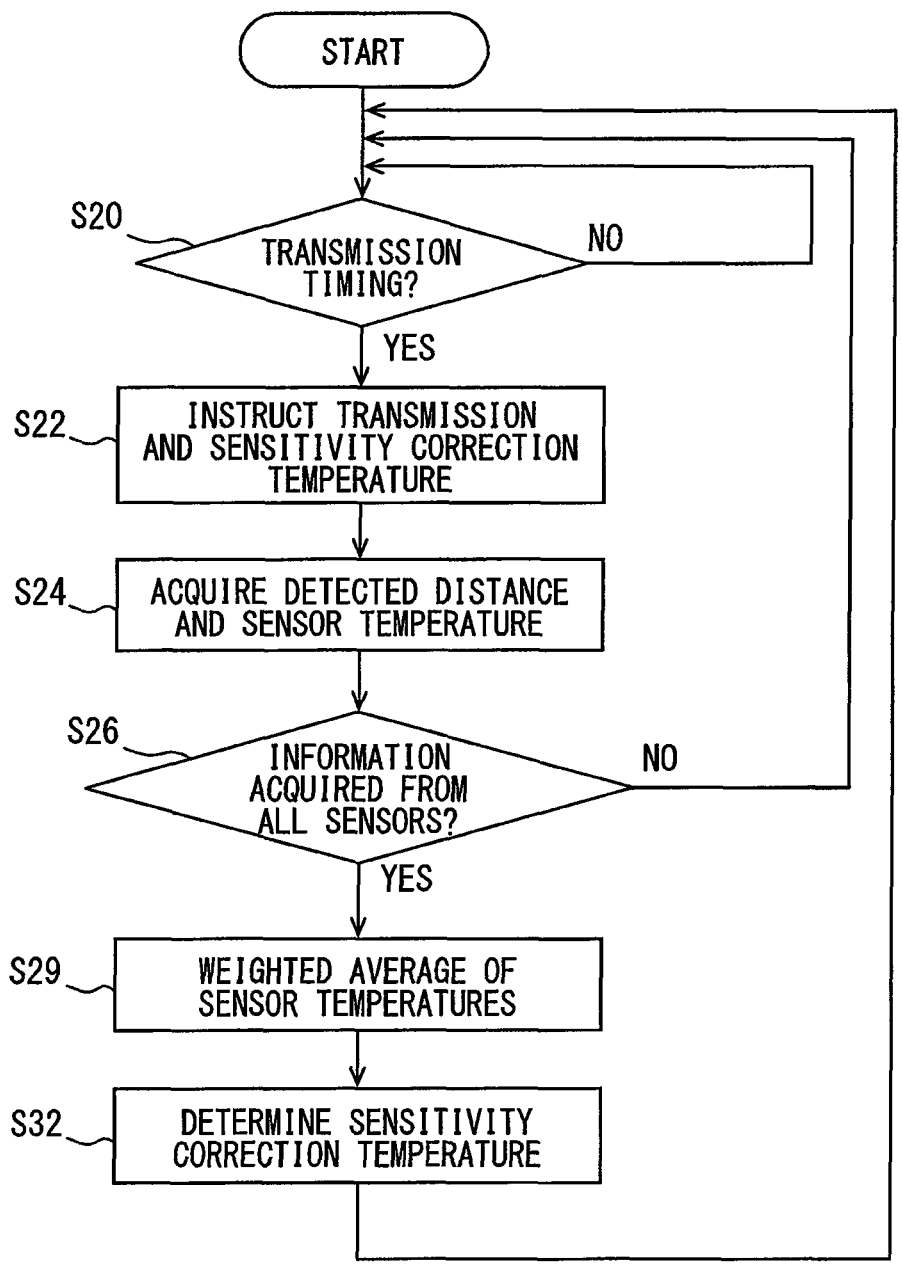
FIG. 6 is a flowchart showing a process executed by a sonar ECU in a second embodiment.

The second embodiment is different from the first embodiment in the process performed at the sonar ECU 20. In the second embodiment, the process shown in FIG. 6 is executed instead of the process shown in FIG. 5. In the process shown in FIG. 6, step S29 is executed instead of steps S28 and S30 in FIG. 5. Other process steps are the same as those of FIG. 5.

At step S29, the weighted average of the sensor temperatures acquired from all the ultrasonic sensors 10A to 10L is obtained. The weight assigned to each temperature is predetermined based on the position where the ultrasonic sensors 10A to 10L are attached. More specifically, the ultrasonic sensor 10 located closer to a heat source in the vehicle C is assigned a lower weight than the ultrasonic sensor 10 located farther from the heat source. To give an example, the weight coefficient of the ultrasonic sensors 10A and 1013 that are more susceptible to the engine exhaust heat is smaller. When the muffler is positioned at the right rear corner of the vehicle C, the ultrasonic sensor 10H that can readily be affected by the heat from the muffler has a small weight coefficient, too.

With the weighted average of sensor temperatures acquired from all the ultrasonic sensors 10A to 10L, which is obtained by assigning a weight to each of the ultrasonic sensors 10A to 10L determined based on their installation locations as in this second embodiment, a sensitivity correction temperature that is close to the actual outside air temperature can be determined.

<Variation 1>

A weighted average may be determined after excluding abnormal values in the second embodiment, too. The method of distinguishing an abnormal value of the lowest temperature may be the same as that of the first embodiment. The same applies to the highest temperature. When the highest temperature of the sensor temperatures is different from the second highest sensor temperature by a predetermined value or more, the highest temperature of the sensor temperatures is determined as abnormal.

Third Embodiment

Figure 7:
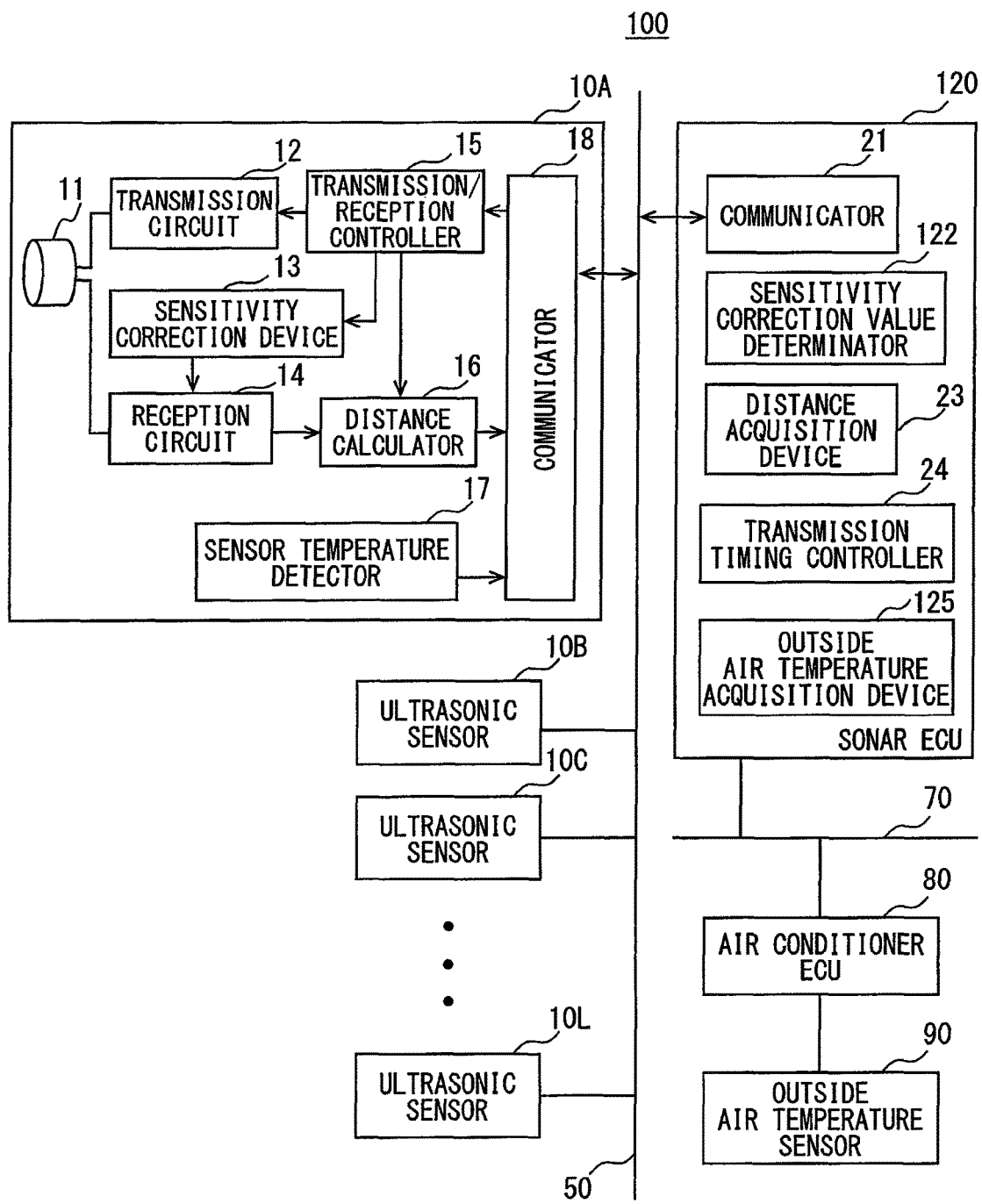
FIG. 7 is a configuration diagram showing an ultrasonic object detection apparatus according to a third embodiment.

In the ultrasonic object detection apparatus 100 of the third embodiment, as shown in FIG. 7, the sonar ECU 120 is capable of communicating with the air conditioner ECU 80 via an in-vehicle LAN 70. The in-vehicle LAN 70 is a CAN (Controller Area Network), for example. CAN is a registered trademark. The air conditioner ECU 80 can acquire outside air temperatures from an outside air temperature sensor 90 mounted on the vehicle C. The outside air temperature sensor 90 is disposed in the engine room of the vehicle C, for example.

In the third embodiment, the process at the sensitivity correction value determinator 122 is different from the sensitivity correction value determinator 22 of the first embodiment. The sensitivity correction value determinator 122 and the sensitivity correction unit 13 make up a detection sensitivity adjuster. The sonar ECU 120 includes an outside air temperature acquisition device 125.

Figure 8:
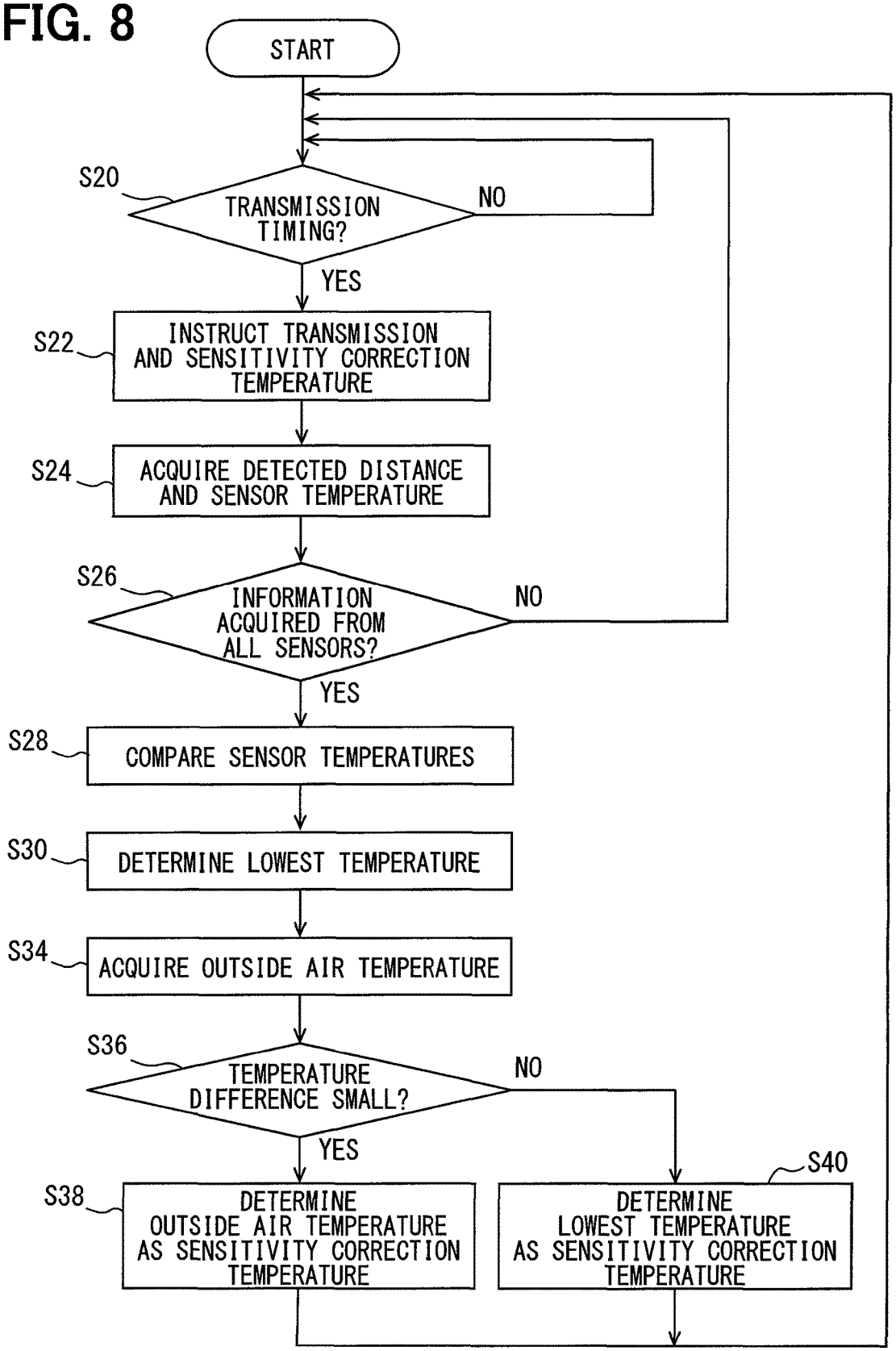
FIG. 8 is a flowchart showing a process executed by the sonar ECU of FIG. 7.

The process at the sensitivity correction value determinator 122 and outside air temperature acquisition device 125 will be described with reference to FIG. 8. FIG. 8 shows the process executed by the sonar ECU 120. In FIG. 8, the process up to step S30 is the same as the process in FIG. 5 of the first embodiment, and the process from step S34 and the following steps is different from that of FIG. 5. Step S34 is performed by the outside air temperature acquisition device 125, and steps S36 to S40 are performed by the sensitivity correction value determinator 122.

At step S34, an outside air temperature detected by the outside air temperature sensor 90 is acquired from the air conditioner ECU 80 via the in-vehicle LAN 70.

At step S36, it is determined whether the temperature difference between the lowest temperature determined at step S30 and the outside air temperature acquired at step S34 is small. This is determined based on whether the temperature difference is not more than a preset temperature difference threshold. If the temperature difference is not more than the temperature difference threshold (S36: YES), the process goes to step S38. At step S38, the outside air temperature is determined as the sensitivity correction temperature.

If, at step S36, the temperature difference is determined as being greater than the temperature difference threshold (S36: NO), the process goes to step S40. At step S40, the lowest temperature determined from the sensor temperatures at step S30 is determined as the sensitivity correction temperature.

Effects of Third Embodiment

The outside air temperature sensor 90, though expensive, is commonly configured to be capable of detecting temperatures with relatively high accuracy. When the outside air temperature detected by this outside air temperature sensor 90 assumes an abnormal value, it is considered, in most cases, that the sensor is affected by a high heat source such as the engine exhaust heat or the like. On the other hand, the lowest temperature of the sensor temperatures is less susceptible to a high heat source such as the engine exhaust heat or the like. Therefore, when the outside air temperature detected by this outside air temperature sensor 90 assumes an abnormal value, it is highly likely that there is a large temperature difference between this outside air temperature and the lowest temperature of the sensor temperatures.

In the third embodiment, the sensor temperatures detected by the sensor temperature detectors 17 are used for determining whether the outside air temperature detected by the outside air temperature sensor 90 is abnormal. When it is very likely that the outside air temperature detected by the outside air temperature sensor 90 is abnormal, the lowest temperature of the sensor temperatures is determined as the sensitivity correction temperature.

In other words, when it is determined that the temperature difference between the outside air temperature detected by the outside air temperature sensor 90 and the lowest temperature of the sensor temperatures is small (S36: YES), the outside air temperature detected by the outside air temperature sensor 90 is assumed to be a normal value, and this outside air temperature is determined as the sensitivity correction temperature (S38). On the other hand, if it is determined that the temperature difference is large (S36: NO), the outside air temperature is assumed to be an abnormal value, and the lowest temperature of the sensor temperatures is determined as the sensitivity correction temperature (S40). This way, a sensitivity correction temperature that accurately represents the outside air temperature can be determined, without using expensive temperature sensors for the sensor temperature detectors 17 included in the respective ultrasonic sensors 10.

Fourth Embodiment

Figure 9:
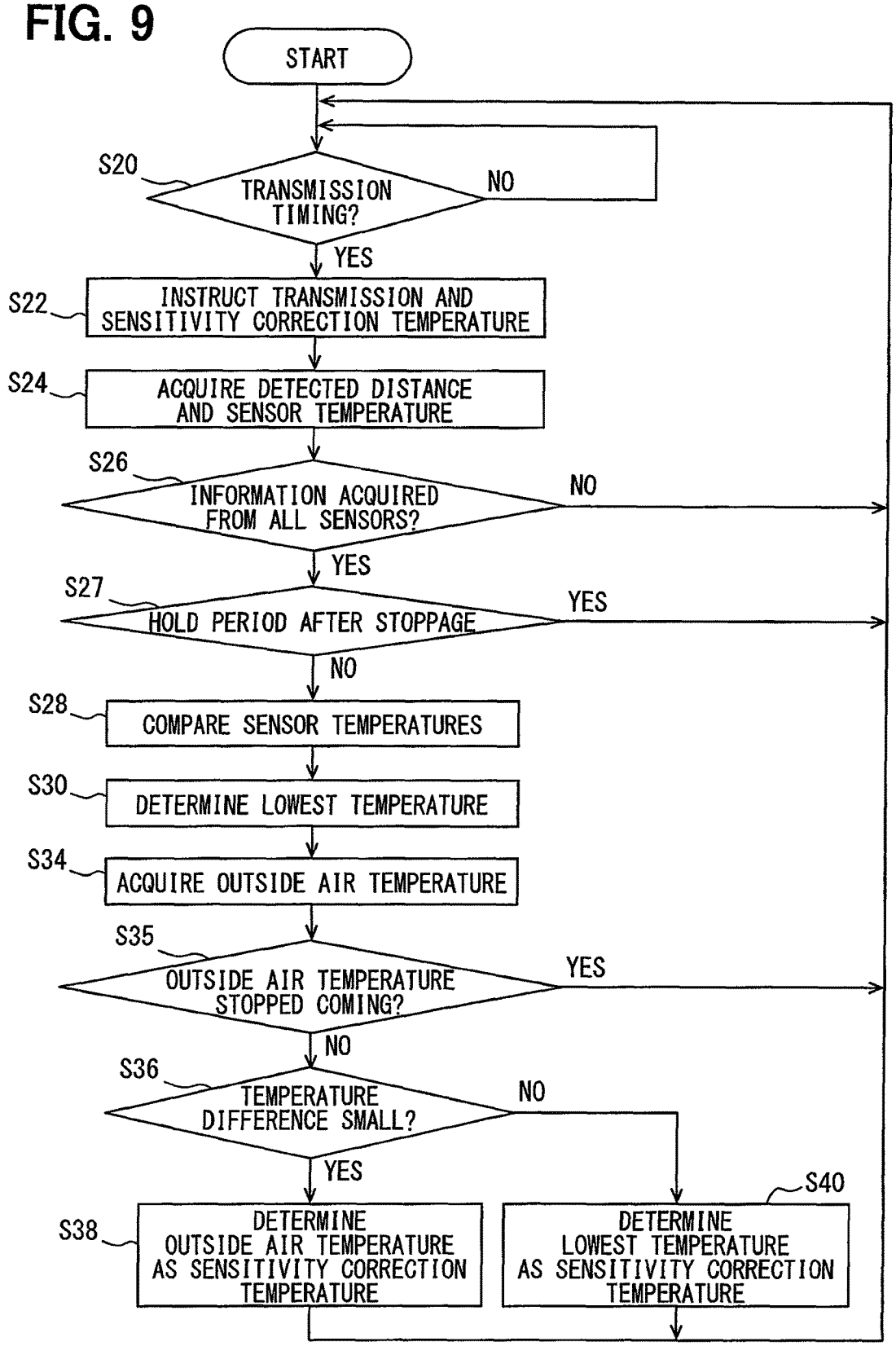
FIG. 9 is a flowchart showing a process executed by a sonar ECU in a fourth embodiment.

In the fourth embodiment, the sonar ECU 120 executes the process shown in FIG. 9 instead of the process shown in FIG. 8. The process shown in FIG. 9 includes steps S27 and S35 in addition to the process of FIG. 8.

At step S27, it is determined whether it is during a hold period after stoppage. The hold period after stoppage is a period that starts upon a determination being made that acquisition of the outside air temperature has stopped at step S35 to be described later, and it is preset to about several to 10 seconds. If it is during the hold period after stoppage, the determination at step S27 will be affirmative. In this case, the process from step S28 and the following steps is not executed and goes back to step S20. Therefore, the sensitivity correction temperature is not changed. In other words, during the hold period after stoppage, the sensitivity correction temperature is held.

The determination at step S27 is NO when it is determined at step S35 that acquisition of the outside air temperature has not stopped, or when it is determined once that acquisition of the outside air temperature has stopped but the hold period after stoppage has lapsed. In this case, the process goes to step S28.

At step S35, it is determined whether the outside air temperature stopped coming. More specifically, it is determined that the outside air temperature stopped coming if, despite a demand sent to the air conditioner ECU 80 to transmit the outside air temperature at step S34, no outside air temperature has been sent via the in-vehicle LAN 70. If it is determined that the outside air temperature stopped coming (S35: YES), the process goes back to step S20. Therefore, in this case, the sensitivity correction temperature is not renewed.

If it is determined that the outside air temperature has not stopped coming (S35: NO), the process from steps S36 to S40 described above is executed, to determine the outside air temperature or the lowest temperature of the sensor temperatures as the sensitivity correction temperature.

(Effects of Fourth Embodiment)

In the fourth embodiment, when it is determined that the outside air temperature stopped coming (S35: NO), the sensitivity correction temperature is not renewed until it is determined that the hold period after stoppage has lapsed (S27: NO). In other words, if it is determined that the outside air temperature stopped coming, the last sensitivity correction temperature before the determination of stoppage of the outside air temperature is held for a certain period of time. Therefore, the reception gain, which is adjusted based on this sensitivity correction temperature, is kept to the last reception gain before the determination of stoppage of the outside air temperature.

In the case that the outside air temperature stopped coming, if the sensitivity correction temperature is immediately switched to the sensor temperature, the detection accuracy of the detected distance may fluctuate in a short time. Such a change in a short time in the detection accuracy of the detected distance during the operation of driver assistance control based on the detected distance such as automatic brake control may lead to an erroneous operation of this driver assistance control.

In the fourth embodiment, however, when it is determined that the outside air temperature stopped coming, the sensitivity correction temperature immediately before the determination of stoppage of the outside air temperature is held during the hold period after stoppage. The driver assistance control based on a detected distance is likely finished during this hold period after stoppage. Thus the possibility of an erroneous operation of driver assistance control based on a detected distance during the control can be reduced.

Fifth Embodiment

Figure 10:
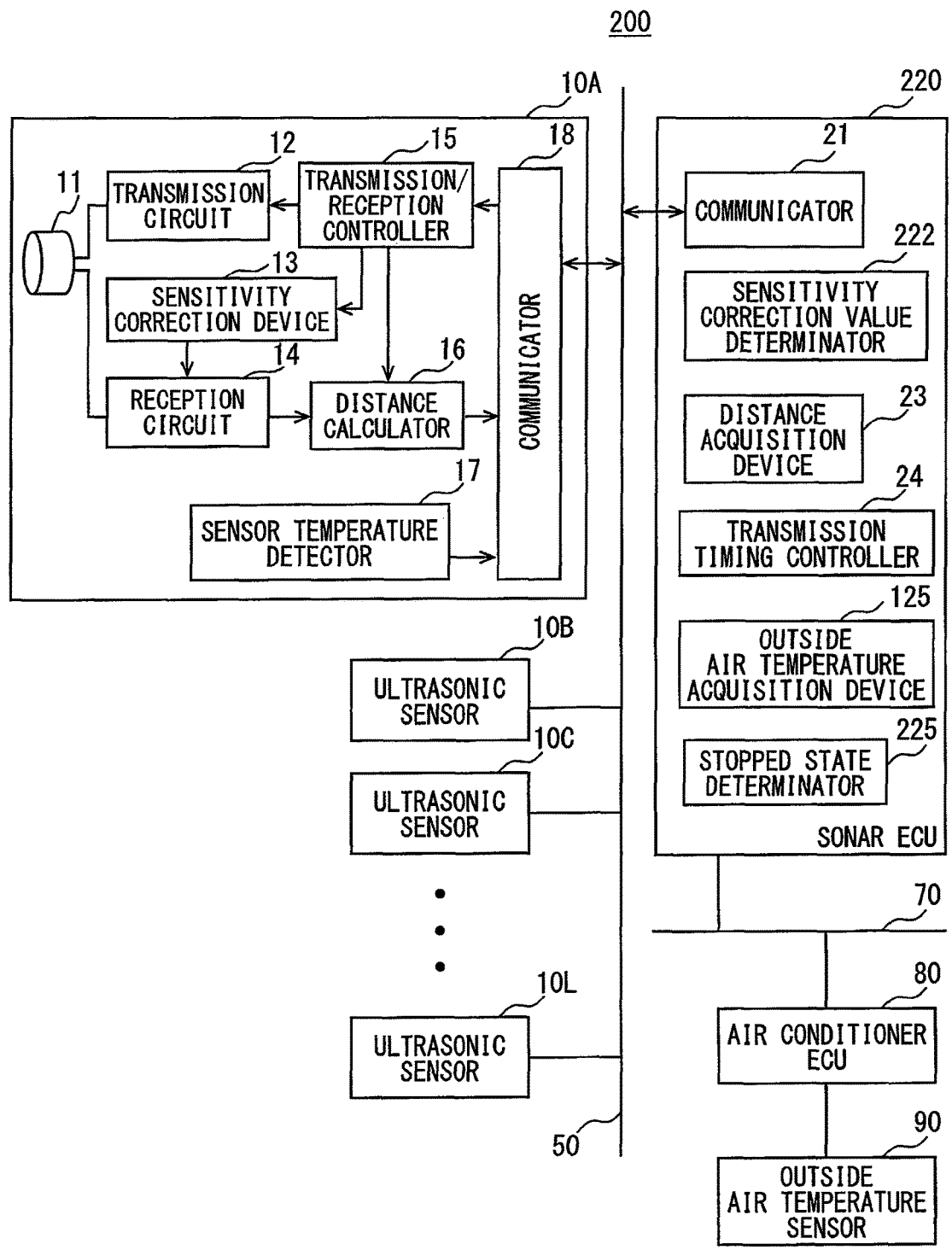
FIG. 10 is a configuration diagram showing an ultrasonic object detection apparatus according to a fifth embodiment.

In the ultrasonic object detection apparatus 200 of the fifth embodiment, the sonar ECU 220 includes a stopped state determinator 225 as shown in FIG. 10. The process at the sensitivity correction value determinator 222 is different from that of the previous embodiments.

Figure 11:
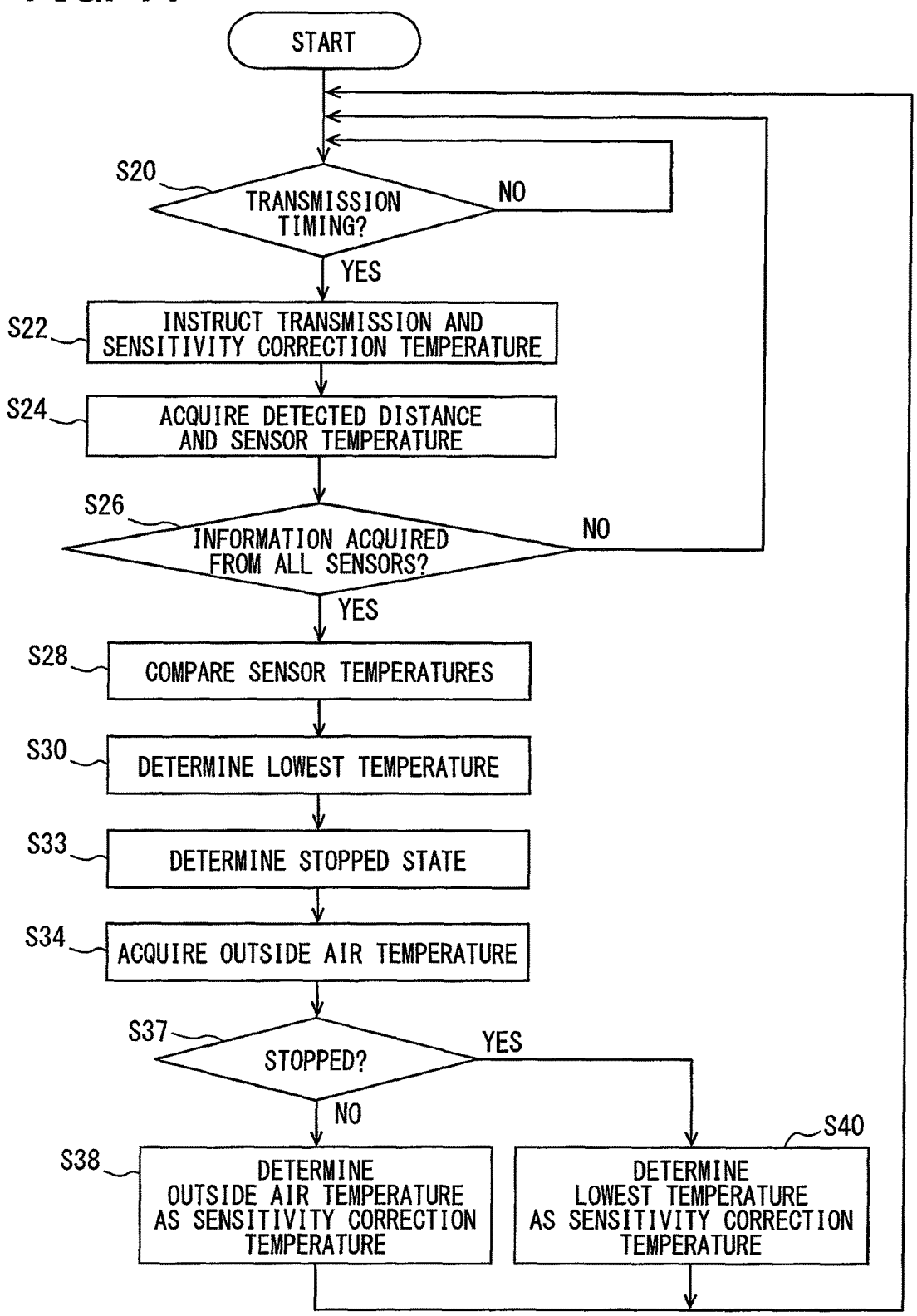
FIG. 11 is a flowchart showing a process executed by the sonar ECU of FIG. 10.

The process at the stopped state determinator 225 and sensitivity correction value determinator 222 will be described with reference to FIG. 11. FIG. 11 shows the process executed by the sonar ECU 220. In FIG. 11, step S33 is executed by the stopped state determinator 225, and steps S37 to S40 are executed by the sensitivity correction value determinator 222.

At step S33, vehicle speed is acquired via the in-vehicle LAN 70, and if the acquired vehicle speed is 0, it is decided that the vehicle C is at a standstill. If the vehicle speed is larger than 0, the vehicle C is determined to be running.

At step S37, it is determined whether the vehicle C is stopped, based on the determination result at step S33. If the vehicle C is determined to be at a standstill (S37: YES), the process goes to step S40, while, if it is determined to be not at a standstill, i.e., running (S37: NO), the process goes to step S40.

Effects of Fifth Embodiment

If the vehicle C is running, it is less likely that the outside air temperature detected by the outside air temperature sensor 90 has been raised because of the influence of a heat source inside the engine room. In other words, it is more likely that a correct outside air temperature is being detected. In the fifth embodiment, therefore, when the vehicle C is determined to be running (S37: NO), the outside air temperature is determined as the sensitivity correction temperature (S38). This way, a sensitivity correction temperature that accurately represents an outside air temperature can be determined during the drive of the vehicle C. When the vehicle C is determined to be stopped (S37: YES), the lowest temperature of the sensor temperatures is determined as the sensitivity correction temperature. The sensor temperature can hardly assume a value that is abnormally higher than the outside air temperature when the vehicle C is at a standstill. Therefore, even if the temperature detected by the outside air temperature sensor 90 is abnormally higher than the outside air temperature because the vehicle C is at a standstill, the possibility of determining the sensitivity correction temperature to be a temperature largely different from the outside air temperature is reduced.

While the embodiments of the present disclosure have been described above, the present disclosure is not limited to the embodiments described above and its technical scope includes the following variations. The present disclosure can be embodied with various changes other than those described below without departing from the scope of the subject matter.

<Variation 2>

In the third embodiment to fifth embodiment, the weighted average of temperatures described in the second embodiment may be used instead of the lowest temperature.

<Variation 3>

When there are ultrasonic sensors 10I to 10L on the side face of the vehicle C as shown in FIG. 2, the sensitivity correction temperature may be determined with the use only of the sensor temperature detectors 17 included in these ultrasonic sensors 10I to 10L. Thus the sensitivity correction temperature is to be determined without using the sensor temperature detectors 17 of the ultrasonic sensors 10A to 10D disposed on the front end face, or the ultrasonic sensors 10E to 10H disposed on the rear end face.

The method of determining the sensitivity correction temperature may be similar to that of the first embodiment and second embodiment except that only the sensor temperature detectors 17 included in the ultrasonic sensors 10I to 10L are used. In other words, the lowest temperature or the weighted average temperature is determined as the sensitivity correction temperature. Similarly to the third to fifth embodiments, which of the outside air temperature, and the lowest temperature, or weighted average temperature is to be used may be determined with the use of the lowest temperature or weighted average temperature determined by using only the sensor temperature detectors 17 included in the ultrasonic sensors 10I to 10L.

<Variation 4>

In the embodiments described above, the reception gain of the reception circuit 14 is controlled based on the sensitivity correction temperature, so that the reception circuit 14 outputs a reception signal of substantially the same intensity irrespective of the outside air temperature when the transceiver 11 receives a reflection wave reflected by an object. Thus the same object detection threshold can be used irrespective of the outside air temperature.

Since the object is detected by a comparison between the object detection threshold and the intensity of the received signal, the object detection threshold may be corrected based on the sensitivity correction temperature, instead of correcting the received signal.

The amount of correction made to the reception gain of the reception circuit 14 and the amount of correction made to the object detection threshold may be suitably adjusted so that both of the reception gain of the reception circuit 14 and the object detection threshold can be corrected based on the sensitivity correction temperature.

<Variation 5>

The number and the positions of the ultrasonic sensors 10 are not limited to the number and positions shown in the above-described embodiments. There may be, for example, only one ultrasonic sensor 10.

<Variation 6>

In the above-described embodiments, the ultrasonic sensor 10 includes the distance calculator 15. Instead, the ECU 20 may include the distance calculator 15. In other words, the ECU 20 may calculate the detected distance.

When the ECU 20 calculates a detected distance, the ultrasonic sensor 10 performs calculations to produce the time interval described above, and sends this time interval to the ECU 20. The ECU 20 multiplies the time interval by the speed of sound and divides the resultant by two to produce the detected distance.

Alternatively, the ECU 20 may also calculate the time interval. In this case, the ultrasonic sensor 10 transmits to the ECU 20 a signal indicating that a reflection wave with an intensity of not less than an object detection threshold has been received. The time point at which the transceiver 11 of the ultrasonic sensor 10 transmitted a wave may be either the time point when the ultrasonic sensor 10 notifies the ECU of the transmission of the transmission wave, or the time point when the ECU 20 outputs a transmission instruction signal to the ultrasonic sensor 10.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An ultrasonic object detection apparatus mounted to a vehicle and comprising:
   at least one transceiver that transmits a transmission wave as an ultrasonic wave to outside of the vehicle and receives a reflection wave of the transmission wave reflected by an object;
   at least one reception circuit that detects a signal level of the reflection wave received by the transceiver;
   at least one object detector that detects an object, based on a comparison between the signal level detected by the reception circuit and an object detection threshold;
   at least one sensor temperature detector that detects an ambient temperature of the transceiver; and
   a detection sensitivity adjuster that performs a detection sensitivity adjustment, which is an adjustment of at least one of a detection sensitivity of the reception circuit and the object detection threshold, based on the ambient temperature detected by the at least one sensor temperature detector, wherein:
   the at least one transceiver includes a plurality of transceivers;
   the at least one reception circuit includes a plurality of reception circuits;
   the at least one object detector includes a plurality of object detectors;
   the at least one sensor temperature detector includes a plurality of sensor temperature detectors;
   the plurality of transceivers, the plurality of reception circuits, the plurality of object detectors, and the plurality of sensor temperature detectors configure a plurality of ultrasonic sensors, respectively; and
   the detection sensitivity adjuster uses a lowest ambient temperature among a plurality of ambient temperatures respectively detected by the plurality of sensor temperature detectors arranged at the plurality of ultrasonic sensors correspondingly, to perform the detection sensitivity adjustment.

2. An ultrasonic object detection apparatus mounted to a vehicle and comprising:
   at least one transceiver—that transmits a transmission wave as an ultrasonic wave to outside of the vehicle and receives a reflection wave of the transmission wave reflected by an object;
   at least one reception circuit that detects a signal level of the reflection wave received by the transceiver;
   at least one object detector that detects an object, based on a comparison between the signal level detected by the reception circuit and an object detection threshold;
   at least one sensor temperature detector that detects an ambient temperature of the transceiver; and
   a detection sensitivity adjuster that performs a detection sensitivity adjustment, which is an adjustment of at least one of a detection sensitivity of the reception circuit and the object detection threshold, based on the ambient temperature detected by the at least one sensor temperature detector, and further comprising:
   an outside air temperature acquisition device that acquires an outside air temperature from an outside air temperature sensor set at a location of the vehicle other than a location where the at least one transceiver detects the ambient temperature and that detects outside air temperatures,
   wherein the detection sensitivity adjuster performs the detection sensitivity adjustment
      using the outside air temperature detected by the outside air temperature sensor based on a determination in which a temperature difference between the outside air temperature acquired by the outside air temperature acquisition device and the ambient temperature detected by one of the plurality of sensor temperature detectors is smaller than a predetermined value, and
      using the ambient temperature detected by the sensor temperature detector based on a determination in which the temperature difference is larger than a predetermined value.

3. The ultrasonic object detection apparatus according to claim 2, wherein:
   the at least one transceiver includes a plurality of transceivers;
   the at least one reception circuit includes a plurality of reception circuits;
   the at least one object detector includes a plurality of object detectors;
   the at least one sensor temperature detector includes a plurality of sensor temperature detectors;
   the plurality of transceivers, the plurality of reception circuits, the plurality of object detectors, and the plurality of sensor temperature detectors configure a plurality of ultrasonic sensors, respectively; and
   the detection sensitivity adjuster uses a lowest ambient temperature among a plurality of ambient temperatures respectively detected by the plurality of sensor temperature detectors arranged at the plurality of ultrasonic sensors correspondingly, to perform the detection sensitivity adjustment.

4. The ultrasonic object detection apparatus according to claim 2, wherein:
   the at least one transceiver includes a plurality of transceivers,
   the at least one reception circuit includes a plurality of reception circuits,
   the at least one object detector includes a plurality of object detectors,
   the at least one sensor temperature detector includes a plurality of sensor temperature detectors,
   the plurality of transceivers, the plurality of reception circuits, the plurality of object detectors, and the plurality of sensor temperature detectors configure a plurality of ultrasonic sensors, respectively,
   the detection sensitivity adjuster uses a weighted average of a plurality of ambient temperatures respectively detected by the plurality of sensor temperature detectors arranged at the plurality of ultrasonic sensors correspondingly, to perform the detection sensitivity adjustment, the weighted average being obtained by using a weight coefficient determined based on installation positions of the plurality of ultrasonic sensors.

5. The ultrasonic object detection apparatus according to claim 2, wherein:
   the at least one transceiver includes a plurality of transceivers,
   the at least one reception circuit includes a plurality of reception circuits,
   the at least one object detector includes a plurality of object detectors,
   the at least one sensor temperature detector includes a plurality of sensor temperature detectors, the plurality of transceivers, the plurality of reception circuits, the plurality of object detectors, and the plurality of sensor temperature detectors configure a plurality of ultrasonic sensors, respectively, and at least one of the plurality of ultrasonic sensors is arranged at a side face of the vehicle, and the detection sensitivity adjuster uses the ambient temperature detected by the at least one sensor temperature detector arranged at the at least one of the plurality of ultrasonic sensors arranged at the side face of the vehicle, to perform the detection sensitivity adjustment to all of the plurality of ultrasonic sensors.

6. The ultrasonic object detection apparatus according to claim 2, wherein, when the outside air temperature acquisition device fails to acquire the outside air temperature from the outside air temperature sensor, the detection sensitivity adjuster holds an adjustment result of the detection sensitivity adjustment when the outside air temperature has been available last time from the outside air temperature sensor for a preset period of time.

7. An ultrasonic object detection apparatus mounted to a vehicle and comprising:

at least one transceiver—that transmits a transmission wave as an ultrasonic wave to outside of the vehicle and receives a reflection wave of the transmission wave reflected by an object;

at least one reception circuit that detects a signal level of the reflection wave received by the transceiver;

at least one object detector that detects an object, based on a comparison between the signal level detected by the reception circuit and an object detection threshold;

at least one sensor temperature detector that detects an ambient temperature of the transceiver; and a detection sensitivity adjuster that performs a detection sensitivity adjustment, which is an adjustment of at least one of a detection sensitivity of the reception circuit and the object detection threshold, based on the ambient temperature detected by the at least one sensor temperature detector, and further comprising:

an outside air temperature acquisition device that acquires an outside air temperature from an outside air temperature sensor set at a location of other than a location where the at least one transceiver detects the ambient temperature and that detects outside air temperatures, and a stopped state determinator that determines whether the vehicle is stopped or running, wherein the detection sensitivity adjuster performs the detection sensitivity adjustment
using the outside air temperature detected by the outside air temperature sensor based on a determination in which the vehicle is stopped carried out by the stopped state determinator, and
using the ambient temperature detected by the at least one sensor temperature detector, based on a determination in which the vehicle is running carried out by the stopped state determinator.

8. An ultrasonic object detection apparatus mounted to a vehicle and comprising:

at least one transceiver—that transmits a transmission wave as an ultrasonic wave to outside of the vehicle and receives a reflection wave of the transmission wave reflected by an object;

at least one reception circuit that detects a signal level of the reflection wave received by the transceiver;

at least one object detector that detects an object, based on a comparison between the signal level detected by the reception circuit and an object detection threshold;

at least one sensor temperature detector that detects an ambient temperature of the transceiver; and a detection sensitivity adjuster that performs a detection sensitivity adjustment, which is an adjustment of at least one of a detection sensitivity of the reception circuit and the object detection threshold, based on the ambient temperature detected by the at least one sensor temperature detector, wherein:

the at least one transceiver includes a plurality of transceivers, the at least one reception circuit includes a plurality of reception circuits, the at least one object detector includes a plurality of object detectors, the at least one sensor temperature detector includes a plurality of sensor temperature detectors, the plurality of transceivers, the plurality of reception circuits, the plurality of object detectors, and the plurality of sensor temperature detectors configure a plurality of ultrasonic sensors, respectively, the detection sensitivity adjuster uses a weighted average of a plurality of ambient temperatures respectively detected by the plurality of sensor temperature detectors arranged at the plurality of ultrasonic sensors correspondingly, to perform the detection sensitivity adjustment, the weighted average being obtained by using a weight coefficient determined based on installation positions of the plurality of ultrasonic sensors.

9. An ultrasonic object detection apparatus mounted to a vehicle and comprising:

at least one transceiver—that transmits a transmission wave as an ultrasonic wave to outside of the vehicle and receives a reflection wave of the transmission wave reflected by an object;

at least one reception circuit that detects a signal level of the reflection wave received by the transceiver;

at least one object detector that detects an object, based on a comparison between the signal level detected by the reception circuit and an object detection threshold;

at least one sensor temperature detector that detects an ambient temperature of the transceiver; and a detection sensitivity adjuster that performs a detection sensitivity adjustment, which is an adjustment of at least one of a detection sensitivity of the reception circuit and the object detection threshold, based on the ambient temperature detected by the at least one sensor temperature detector, wherein:

the at least one transceiver includes a plurality of transceivers, the at least one reception circuit includes a plurality of reception circuits, the at least one object detector includes a plurality of object detectors, the at least one sensor temperature detector includes a plurality of sensor temperature detectors, the plurality of transceivers, the plurality of reception circuits, the plurality of object detectors, and the plurality of sensor temperature detectors configure a plurality of ultrasonic sensors, respectively, and at least one of the plurality of ultrasonic sensors is arranged at a side face of the vehicle, and the detection sensitivity adjuster uses the ambient temperature detected by the at least one sensor temperature detector arranged at the at least one of the plurality of ultrasonic sensors arranged at the side face of the vehicle, to perform the detection sensitivity adjustment to all of the plurality of ultrasonic sensors.

\* \* \* \* \*